US010217025B2

(12) United States Patent
Zhang et al.

(10) Patent No.: US 10,217,025 B2
(45) Date of Patent: Feb. 26, 2019

(54) METHOD AND APPARATUS FOR DETERMINING RELEVANCE BETWEEN NEWS AND FOR CALCULATING RELEVANCE AMONG MULTIPLE PIECES OF NEWS (71) Applicant: BEIJING QIHOO TECHNOLOGY COMPANY LIMITED, Beijing (CN)

(72) Inventors: Shenzheng Zhang, Beijing (CN); Shaojun Wei, Beijing (CN); Peijun Chen, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 15/744,688

(22) PCT Filed: Oct. 26, 2016

(86) PCT No.: PCT/CN2016/103397
§ 371 (c)(1),
(2) Date: Jan. 12, 2018

(87) PCT Pub. No.: WO2017/107651
PCT Pub. Date: Jun. 29, 2017

(65) Prior Publication Data
US 2018/0197045 A1    Jul. 12, 2018

(30) Foreign Application Priority Data

Dec. 22, 2015  (CN) .......................... 2015 1 0974316
Dec. 22, 2015  (CN) .......................... 2015 1 0974431

(51) Int. Cl.
*G06K 9/00*    (2006.01)
*G06K 9/62*    (2006.01)
(Continued)

(52) U.S. Cl.
CPC ....... *G06K 9/6215* (2013.01); *G06F 17/2785* (2013.01); *G06F 17/30* (2013.01);
(Continued)

(58) Field of Classification Search
CPC ........ G06K 9/346; G06K 9/32; G06K 9/3286; G06K 9/342; G06K 9/48; G06F 17/21
See application file for complete search history.

(56) References Cited

U.S. PATENT DOCUMENTS 6,182,008 B1 *  1/2001  Nikiel .................. G06Q 10/047
                                                                340/990
8,209,278 B1 *  6/2012  Straus ..................... G06Q 50/18
                                                                705/1.1
(Continued)

FOREIGN PATENT DOCUMENTS

CN        1959671 A        5/2007
CN        103164427 A      6/2013
(Continued)

OTHER PUBLICATIONS

International Patent Application No. PCT/CN2016/103397; Int'l Search Report; dated Jan. 18, 2017; 3 pages.

*Primary Examiner* — Amir Alavi
(74) *Attorney, Agent, or Firm* — Baker & Hostetler LLP (57) ABSTRACT The present invention provides a method and an apparatus for determining relevance between news and for calculating relevance among multiple pieces of news. The method for determining relevance between news comprises: comparing a piece of first news with a piece of benchmarking news to obtain a distance between the first news and the benchmarking news; comparing a piece of second news with the benchmarking news to obtain a distance between the second news and the benchmarking news; and calculating a distance differential between the distance between the first news and the benchmarking news and the distance between the second
(Continued)

news and the benchmarking news to determine the relevance between the first news and the second news according to the distance differential.

10 Claims, 5 Drawing Sheets

(51) Int. Cl.
  G06F 17/27    (2006.01)
  G06F 17/30    (2006.01)
(52) U.S. Cl.
  CPC ... G06F 17/30657 (2013.01); G06K 9/00463 (2013.01); G06K 9/00469 (2013.01)

(56) References Cited

U.S. PATENT DOCUMENTS

| | | | | |
|---|---|---|---|---|
| 9,177,014 B2* | 11/2015 | Gross | ............... | G06F 17/30867 |
| 2002/0147815 A1* | 10/2002 | Tormasov | ......... | G06F 17/30209 |
| | | | | 709/226 |
| 2003/0163785 A1* | 8/2003 | Chao | .................... | G06F 17/211 |
| | | | | 715/246 |
| 2009/0265160 A1 | 10/2009 | Williams et al. | | |
| 2012/0254333 A1* | 10/2012 | Chandramouli | ........ | G06F 17/27 |
| | | | | 709/206 |
| 2013/0238720 A1* | 9/2013 | Tulasidas | ............ | H04L 67/1095 |
| | | | | 709/206 |
| 2018/0197045 A1* | 7/2018 | Zhang | ................ | G06K 9/00463 |

FOREIGN PATENT DOCUMENTS

| | | |
|---|---|---|
| CN | 103257957 A | 8/2013 |
| CN | 103324666 A | 9/2013 |
| CN | 103389975 A | 11/2013 |
| CN | 103678645 A | 3/2014 |
| CN | 104090890 A | 10/2014 |
| CN | 104346476 A | 2/2015 |
| CN | 104361062 A | 2/2015 |
| CN | 104424279 A | 3/2015 |
| CN | 104462323 A | 3/2015 |
| CN | 105022840 A | 11/2015 |
| CN | 105528335 A | 4/2016 |
| CN | 105630766 A | 6/2016 |

\* cited by examiner

METHOD AND APPARATUS FOR DETERMINING RELEVANCE BETWEEN NEWS AND FOR CALCULATING RELEVANCE AMONG MULTIPLE PIECES OF NEWS

CROSS-REFERENCE TO RELATED APPLICATIONS

This application is the national stage of International Application No. PCT/CN2016/103397 filed Oct. 26, 2016, which claims priority to Chinese Patent Applications No. CN201510974316.5, filed Dec. 22, 2015, and Chinese Patent Applications No. CN201510974431.2, filed Dec. 22, 2015, the entirety of which are incorporated herein by reference.

FIELD OF TECHNOLOGY

The present invention relates to the field of computer technologies, and specifically, to a method and an apparatus for determining relevance between news, and a method and an apparatus for calculating relevance among multiple pieces of news.

BACKGROUND

In the field of Internet, when a piece of new news appears, it is required to compare this news with existing news to determine which news among the existing news are related to the new news, so that the related news may be recommended to a user together with the new news when the user is viewing the news.

The number of the existing news is huge, and each piece of new news needs to be compared with all the existing news, which results in a huge calculation amount and a low efficiency in calculating relevance among the news.

SUMMARY

In view of the aforementioned problems, the present invention is proposed to provide a method and an apparatus for determining relevance between news and a method and an apparatus for calculating relevance among multiple pieces of news to overcome the aforementioned problems or at least in part solving the aforementioned problems.

According to an aspect of the present invention, there is provided a method for determining relevance between news, comprising: comparing a piece of first news with a piece of benchmarking news to obtain a distance between the first news and the benchmarking news; comparing a piece of second news with the benchmarking news to obtain a distance between the second news and the benchmarking news; and calculating a distance differential between the distance between the first news and the benchmarking news and the distance between the second news and the benchmarking news to determine the relevance between the first news and the second news according to the distance differential.

According to another aspect of the present invention, there is provided an apparatus for determining relevance between news, comprising: a first distance calculating module, configured to compare a piece of first news with a piece of benchmarking news to obtain a distance between the first news and the benchmarking news; a second distance calculating module, configured to compare a piece of second news with the benchmarking news to obtain a distance between the second news and the benchmarking news; and a relevance calculating module, configured to calculate a distance differential between the distance between the first news and the benchmarking news and the distance between the second news and the benchmarking news to determine the relevance between the first news and the second news according to the distance differential.

According to the above technical solutions, the method and the apparatus for determining relevance between news of the present invention at least have the following advantages.

According to the technical solutions of the present invention, when it is required to analyze relevance among different news, it is unnecessary to compare multiple pieces of news but to compare the plurality of news with a piece of benchmarking news. When two pieces of news are similar, in distance, to the benchmarking news, this indicates that the two pieces of news have a certain similarity. There is only one piece of benchmarking news, and the relevance among the plurality of news may be determined only by comparing the plurality of news with the benchmarking news without comparing the plurality of news one another. Therefore, it is efficient to acquire relevant news according to the technical solutions of the present invention.

According to still another aspect of the present invention, there is provided a method for calculating relevance among multiple pieces of news, comprising: determining a primary correlation between the first news and the second news; determining a primary correlation between the second news and a piece of third news; and establishing a secondary correlation between the first news and the third news according to the primary correlation between the first news and the second news and the primary correlation between the second news and the third news.

According to still another aspect of the present invention, there is provided an apparatus for calculating relevance among multiple pieces of news, comprising: a first correlation determining module, configured to determine a primary correlation between a piece of first news and a piece of second news; a second correlation determining module, configured to determine a primary correlation between the second news and a piece of third news; and a third correlation determining module, configured to establish a secondary correlation between the first news and the third news according to the primary correlation between the first news and the second news and the primary correlation between the second news and the third news.

According to the above technical solutions, the method and the apparatus for calculating relevance among multiple pieces of news of the present invention at least have the following advantages.

In the technical solutions of the present invention, the primary correlation between the first news and the second news reflects a similarity between the first news and the second news in literal content, and the primary correlation between the second news and the third news reflects a similarity between the first news and the second news in literal content. However, the secondary correlation between the first news and the third news obtained by calculation is not limited by the literal content. This is because a literally similar portion between the second news and the first news may be different from that between the second news and the third news. The secondary correlation between the first news and the third news actually reflects a semantic similarity between the first news and the third news. Therefore, literally different but semantically similar news may be searched out according to the established secondary correlation of the present invention.

According to still another aspect of the present invention, there is provided a computer program, comprising a computer-readable code. When the computer-readable code runs on a computing device, the computing device is caused to execute the method for determining relevance between news and/or the method for calculating relevance among multiple pieces of news according to any one of the above embodiments.

According to still another aspect of the present invention, there is provided a computer-readable medium, in which the above computer program is stored.

Described above is merely an overview of the technical solutions of the present invention. In order to more apparently understand the technical means of the present invention to implement in accordance with the contents of specification, and to more readily understand above and other objectives, features and advantages of the present invention, specific embodiments of the present invention are provided hereinafter.

BRIEF DESCRIPTION OF THE DRAWINGS

Various other advantages and benefits will become apparent to those of ordinary skill in the art by reading the detailed description of the following preferred embodiments. The accompanying drawings are merely intended for showing preferred embodiments, but are not deemed to limit the present invention. Further, throughout the drawings, same elements are indicated by same reference numbers. In the drawings.

DESCRIPTION OF THE EMBODIMENTS

A further description of the present invention is made with reference to the accompanying drawings and specific embodiments hereinafter.

Figure 1:
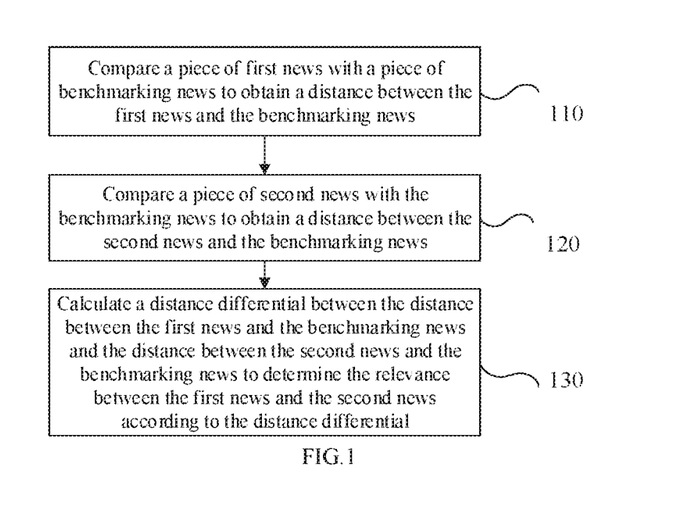
FIG. 1 illustrates a flowchart of a method for determining relevance between news according to an embodiment of the present invention.

As shown in FIG. 1, an embodiment of the present invention provides a method for determining relevance between news, comprising following steps.

Step 110: comparing a piece of first news with a piece of benchmarking news to obtain a distance between the first news and the benchmarking news. In this embodiment, no restriction is imposed on the benchmarking news. That is, any piece of news may be selected as the benchmarking news.

Step 120: comparing a piece of second news with the benchmarking news to obtain a distance between the second news and the benchmarking news.

Step 130: calculating a distance differential between the distance between the first news and the benchmarking news and the distance between the second news and the benchmarking news to determine the relevance between the first news and the second news according to the distance differential.

In this embodiment, the distance reflects the differential between news, and this embodiment does not limit the way of calculating the distance. According to the technical solution of this embodiment, it is easy to understand that when the distance between the first news and the benchmark news is similar to the distance between the second news and the benchmark news, this indicates that the distance between the first news and the second news is nearer, that is, the correlation between the first news and the second news is relatively strong. When the distance between the first news and the benchmark news is nearer and the distance between the second news and the benchmark news is farther, this indicates that the distance between the first news and the second news is farther, and the correlation between the first news and the second news is weaker.

An embodiment of the present invention further provides a method for determining relevance between news. Compared with the preceding embodiment, the method for determining relevance between news in this embodiment, before Step 110, further comprises: recognizing a type of the first news and selecting the benchmarking news having a corresponding type from a set of benchmarking news.

In this embodiment, when the distance between the first news and the benchmarking news and the distance between the second news and the benchmarking news are too large, this only indicates that the first news and the second news greatly differ from the benchmarking news, but it is difficult to indicate how the relevance between the first news and the second news is. Higher relevance exists between news of the same type. In this embodiment, the distance between the first news and the benchmarking news is smaller, this indicates that the relevance between the first news and the benchmarking news is higher. When the distance between the second news and the benchmarking news is large, this amounts to a fact that the distance between the second news and the first news is large, namely, the relevance between the first news and the second news is weaker. When the distance between the second news and the benchmarking news is small, this amounts to a fact that the distance between the second news and the first news is small, namely, the relevance between the first news and the second news is stronger. For example, when the first news is a piece of sports news, the selected benchmarking news is the sports news.

An embodiment of the present invention further provides a method for determining relevance between news. Compared with the preceding embodiment, the method for determining relevance between news in this embodiment, before Step 110, further comprises: acquiring a keyword in the first news and selecting the benchmarking news having the keyword from the set of benchmarking news.

In this embodiment, when the distance between the first news and the benchmarking news and the distance between the second news and the benchmarking news are too large, this only indicates that the first news and the second news greatly differ from the benchmarking news, but it is difficult to indicate how the relevance between the first news and the second news is. Higher relevance exists between news having the same keyword. In this embodiment, the distance between the first news and the benchmarking news is smaller, this indicates that the relevance between the first news and the benchmarking news is higher. When the distance between the second news and the benchmarking news is large, this amounts to a fact that the distance between the second news and the first news is large, namely, the relevance between the first news and the second news is weaker. When the distance between the second news and the benchmarking news is small, this amounts to a fact that the distance between the second news and the first news is small, namely, the relevance between the first news and the second news is stronger. For example, when a title of the first news is Star A Won An Award, the selected benchmarking news may be Full Record of Star A, and the keyword is Star A.

An embodiment of the present invention further provides a method for determining relevance between news. Compared with the preceding embodiment, Step 110 in the method for determining relevance between news in this embodiment specifically comprises: acquiring a feature attribute of the first news, generating a vector corresponding to the first news according to the feature attribute of the first news, and comparing the vector corresponding to the first news with a vector corresponding to the benchmarking news. Step 120 in the method for determining relevance between news in this embodiment specifically comprises: acquiring a feature attribute of the second news, generating a vector corresponding to the second news according to the feature attribute of the second news, and comparing the vector corresponding to the second news with the vector corresponding to the benchmarking news.

In this embodiment, the feature attribute is not limited, and it is easy to quantize the news into numerals using one or more feature attributes of the news, so that it can be more easily and more accurately to calculate the distance between the news.

An embodiment of the present invention further provides a method for determining relevance between news. Compared with the preceding embodiment, Step 110 in the method for determining relevance between news in this embodiment specifically comprises: performing word segmentation on the first news to obtain a plurality of words, calculating a word frequency of the plurality of words of the first news, and determining the word frequency as the feature attribute of the first news. Step 120 in the method for determining relevance between news in this embodiment specifically comprises: performing word segmentation on the second news to obtain a plurality of words, calculating a word frequency of the plurality of words of the second news, and determining the word frequency as the feature attribute of the second news.

In this embodiment, a random number may be allocated to the first news, and an article vector may be constructed for the first news according to the random number and the word frequency obtained by calculation. Likewise, a corresponding article vector also may be constructed for the second news and the benchmarking news. In this embodiment, by calculating after taking a minimum hash value for the first news, the second news and the benchmarking news, the specific distance value between the first news and the benchmarking news and the distance value between the second news and the benchmarking news can be obtained. For example, the distance between News A and the benchmarking news and the distance between News B and the benchmarking news are 4 and 3 respectively, wherein the differential is 1, which indicates that the relevance between the News A and the News B is higher. Whereas the differential between News C and the benchmarking news is 1, and the distance differential between the News C and the News A or News B is larger, that is, the relevance is lower.

An embodiment of the present invention further provides a method for determining relevance between news. Compared with the preceding embodiment, Step 130 in the method for determining relevance between news in this embodiment specifically comprises: setting the second news as a piece of related news of the first news when the distance differential is within a preset interval to push the second news when it is required to push the related news of the first news. For example, with reference to the contents of the foregoing embodiments, supposing the preset interval is 0-1, the News A is the related news of the News B, and the user may push the News B when viewing the News A.

Figure 2:
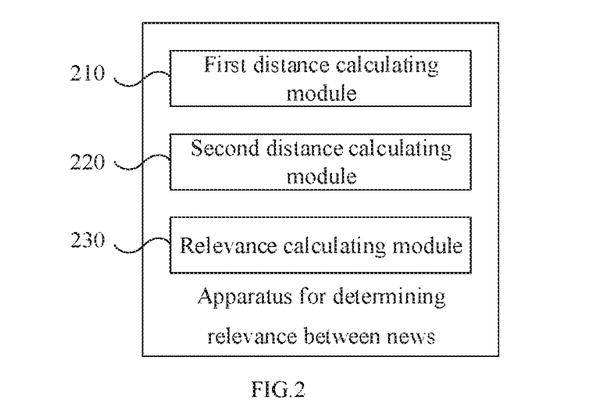
FIG. 2 illustrates a block diagram of an apparatus for determining relevance between news according to an embodiment of the present invention.

As shown in FIG. 2, an apparatus for determining relevance between news according to an embodiment of the present invention comprises:

a first distance calculating module 210, configured to compare a piece of first news with a piece of benchmarking news to obtain a distance between the first news and the benchmarking news. In this embodiment, no restriction is imposed on the benchmarking news. That is, any piece of news may be selected as the benchmarking news;

a second distance calculating module 220, configured to compare a piece of second news with the benchmarking news to obtain a distance between the second news and the benchmarking news;

a relevance calculating module 230, configured to calculate a distance differential between the distance between the first news and the benchmarking news and the distance between the second news and the benchmarking news to determine the relevance between the first news and the second news according to the distance differential.

In this embodiment, the distance reflects the differential between news, and this embodiment does not limit the way of calculating the distance. According to the technical solution of this embodiment, it is easy to understand that when the distance between the first news and the benchmark news and the distance between the second news and the benchmark news is similar, it indicates that the distance between the first news and the second news is nearer, that is, the correlation between the two pieces of news is relatively strong. When the distance between the first news and the benchmark news is nearer and the distance between the second news and the benchmark news is farther, it indicates that the distance between the first news and the second news is farther, and the correlation between the two pieces of news is weaker.

Figure 3:
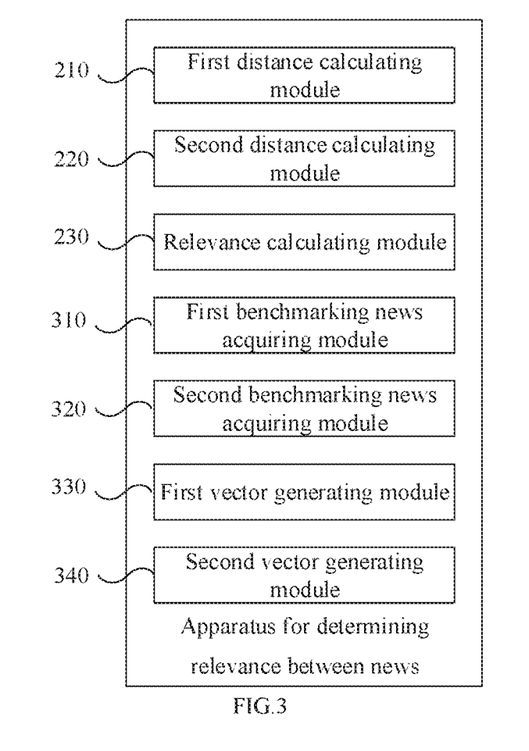
FIG. 3 illustrates a block diagram of an apparatus for determining relevance between news according to an embodiment of the present invention.

As shown in FIG. 3, an embodiment of the present invention further provides an apparatus for determining relevance between news. Compared with the preceding embodiment, the apparatus for determining relevance between news in this embodiment further comprises:

a first benchmarking news acquiring module 310, configured to recognize a type of the first news and select the benchmarking news having a corresponding type from a set of benchmarking news.

In this embodiment, when the distance between the first news and the benchmarking news and the distance between the second news and the benchmarking news are too large, this only indicates that the first news and the second news greatly differ from the benchmarking news, but it is difficult to indicate how the relevance between the first news and the second news is. Higher relevance exists between news of the same type. In this embodiment, the distance between the first news and the benchmarking news is smaller, this indicates that the relevance between the first news and the benchmarking news is higher. When the distance between the second news and the benchmarking news is large, this amounts to a fact that the distance between the second news and the first news is large, namely, the relevance between the first news and the second news is weaker. When the distance between the second news and the benchmarking news is small, this amounts to a fact that the distance between the second news and the first news is small, namely, the relevance between the first news and the second news is stronger. For example, when the first news is a piece of sports news, the selected benchmarking news is the sports news.

As shown in FIG. 3, an embodiment of the present invention further provides an apparatus for determining relevance between news. Compared with the preceding embodiment, the apparatus for determining relevance between news in this embodiment further comprises:

a second benchmarking news acquiring module 320, configured to acquire a keyword in the first news and select the benchmarking news having the keyword from the set of benchmarking news.

In this embodiment, when the distance between the first news and the benchmarking news and the distance between the second news and the benchmarking news are too large, this only indicates that the first news and the second news greatly differ from the benchmarking news, but it is difficult to indicate how the relevance between the first news and the second news is. Higher relevance exists between news having the same keyword. In this embodiment, the distance between the first news and the benchmarking news is smaller, this indicates that the relevance between the first news and the benchmarking news is higher. When the distance between the second news and the benchmarking news is large, this amounts to a fact that the distance between the second news and the first news is large, namely, the relevance between the first news and the second news is weaker. When the distance between the second news and the benchmarking news is small, this amounts to a fact that the distance between the second news and the first news is small, namely, the relevance between the first news and the second news is stronger. For example, when a title of the first news is Star A Won An Award, the selected benchmarking news may be Full Record of Star A, and the keyword is Star A.

As shown in FIG. 3, an embodiment of the present invention further provides an apparatus for determining relevance between news. Compared with the preceding embodiment, the apparatus for determining relevance between news in this embodiment further comprises:

a first vector generating module 330, configured to acquire a feature attribute of the first news, and generate a vector corresponding to the first news according to the feature attribute of the first news;

wherein the first benchmarking news acquiring module 310 is further configured to compare the vector corresponding to the first news with a vector corresponding to the benchmarking news; and a second vector generating module 340, configured to acquire a feature attribute of the second news, and generate a vector corresponding to the second news according to the feature attribute of the second news.

The first benchmarking news acquiring module 320 is further configured to compare the vector corresponding to the second news with the vector corresponding to the benchmarking news.

In this embodiment, the feature attribute is not limited, and it is easy to quantize the news into numerals using one or more feature attributes of the news, so that it can be more easily and more accurately to calculate the distance between the news.

An embodiment of the present invention further provides an apparatus for determining relevance between news. Compared with the preceding embodiment, in the apparatus for determining relevance between news according to this embodiment, the first vector generating module 330 is further configured to perform word segmentation on the first news to obtain a plurality of words, calculate a word frequency of the plurality of words of the first news, and determine the word frequency as the feature attribute of the first news.

The second vector generating module 340 is further configured to perform word segmentation on the second news to obtain a plurality of words, calculate a word frequency of the plurality of words of the second news, and determine the word frequency as the feature attribute of the second news.

In this embodiment, a random number may be allocated to the first news, and an article vector may be constructed for the first news according to the random number and the word frequency obtained by calculation. Likewise, a corresponding article vector also may be constructed for the second news and the benchmarking news. In this embodiment, by calculating after taking a minimum hash value for the first news, the second news and the benchmarking news, the specific distance value between the first news and the benchmarking news and the distance value between the second news and the benchmarking news can be obtained. For example, the distance between News A and the benchmarking news and the distance between News B and the benchmarking news are 4 and 3 respectively, wherein the differential is 1, which indicates that the relevance between the News A and the News B is higher. Whereas, the differential between News C and the benchmarking news is 1, and the distance differential between the News C and the News A or News B is larger, that is, the relevance is lower.

An embodiment of the present invention further provides an apparatus for determining relevance between news. Compared with the preceding embodiment, in the apparatus for determining relevance between news in this embodiment, the relevance calculating module 310 is further configured to set the second news as a piece of related news of the first news when the distance differential is within a preset interval to push the second news when it is required to push the related news of the first news. For example, with reference to the contents of the foregoing embodiments, supposing the preset interval is 0-1, the News A is the related news of the News B, and the user may push the News B when viewing the News A.

Further, in the field of Internet, when a piece of news appears, generally it is required to search the related news for this news, so that both this news and the related news thereof are pushed to the user together.

In the prior art, generally the related news is searched according to literal contents of a piece of news. This manner of searching the related news has larger defects. This is because two pieces of related news may likely be semantically identical but literally different, so that it is impossible to find and determine semantically identical but literally different news as the related news according to the prior art.

Figure 4:
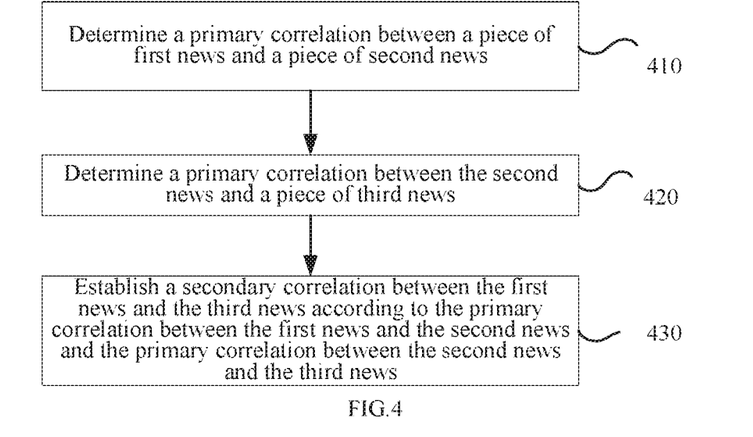
FIG. 4 illustrates a flowchart of a method for calculating relevance among multiple pieces of news according to an embodiment of the present invention.

To solve this technical problem, as shown in FIG. 4, an embodiment of the present invention provides a method for calculating relevance among multiple pieces of news, comprising following steps.

Step 410: determining a primary correlation between a piece of first news and a piece of second news. In this embodiment, the primary correlation between the first news and the second news reflects a similarity between the first news and the second news in literal content.

Step 420: determining a primary correlation between the second news and a piece of third news. The primary correlation between the second news and the third news reflects a similarity between the first news and the second news in literal content.

Step 430: establishing a secondary correlation between the first news and the third news according to the primary correlation between the first news and the second news and the primary correlation between the second news and the third news.

According to the technical solution of this embodiment, the secondary correlation between the first news and the third news obtained by calculation is not limited by the literal content. This is because a literally similar portion between the second news and the first news may be different from that between the second news and the third news. The secondary correlation between the first news and the third news actually reflects a semantic similarity between the first news and the third news. Therefore, literally different but semantically similar news may be searched out according to the established secondary correlation of the present invention.

An embodiment of the present invention further provides a method for calculating relevance among multiple pieces of news. Compared with the preceding embodiment, Step 410 in the method for calculating relevance among multiple pieces of news in this embodiment specifically comprises:

setting a first vector according to the feature attribute of the first news, setting a second vector according to the feature attribute of the second news, calculating a cosine similarity between the first vector and the second vector, and determining the cosine similarity as the primary correlation between the first news and the second news.

In this embodiment, no restriction is imposed on the feature attribute. For example, the feature attribute such as word frequency of word segmentation and publication time may be used for generating the vector. Using the cosine similarity as the primary correlation, the obtained primary correlation can reflect the similarity between the first news and the second news. For example, for the News A and the News B, the primary correlation between the News A and the News B is:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

wherein the i is a dimension of a vector, and the similarity is a preset similarity.

Step 420 in the method for calculating relevance among multiple pieces of news in this embodiment specifically comprises: setting a third vector according to the feature attribute of the third news, calculating a cosine similarity between the second vector and the third vector, and determining the cosine similarity as the primary correlation between the second news and the third news. Likewise, the primary correlation between the second news and the third news may also be calculated out using the cosine similarity.

Figure 5:
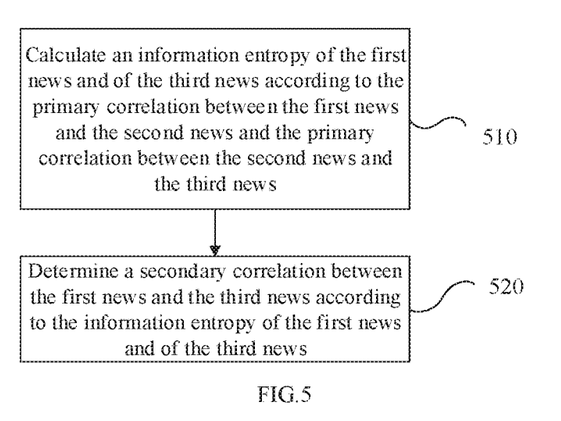
FIG. 5 illustrates a flowchart of a method for calculating relevance among multiple pieces of news according to an embodiment of the present invention.

As shown in FIG. 5, an embodiment of the present invention further provides a method for calculating relevance among multiple pieces of news. Compared with the preceding embodiment, Step 430 in the method for calculating relevance among multiple pieces of news in this embodiment specifically comprises:

Step 510: calculating an information entropy of the first news and of the third news according to the primary correlation between the first news and the second news and the primary correlation between the second news and the third news. In this embodiment, a secondary correlation between the first news and the third news is determined using the information entropy, and the obtained secondary correlation can reflect the semantic similarity between the first news and the third news, and is not affected by whether or not being literally similar. For example, when the relation between the News A and the News B is the primary correlation and the relation between the News B and the News C is the primary correlation, the information entropy of the News A and the News C is:

$$H(A, C) = \sum_{B} -p(A, B, C)\log p(A, B, C)$$

wherein the p(A,Bi,C) is a path probability of the News A reaching the News C through the News Bi, and the i indicates that the News B comprises a plurality of news.

Figure 6:
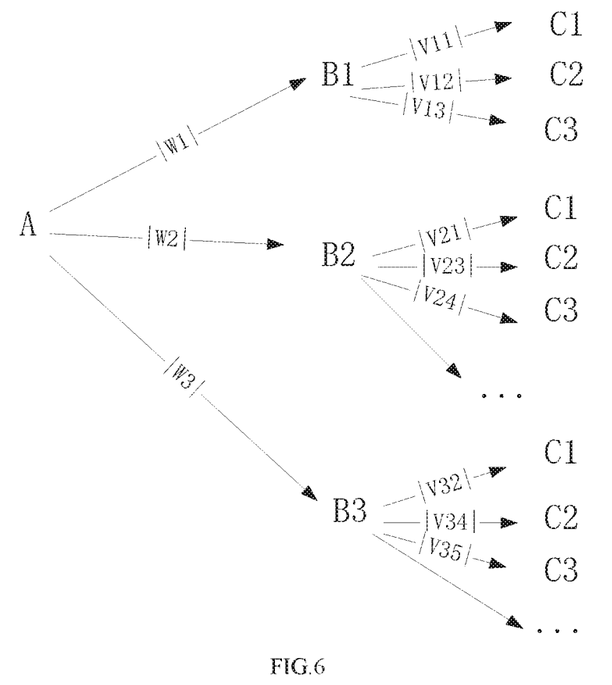
FIG. 6 illustrates a schematic diagram of a method for calculating relevance among multiple pieces of news according to an embodiment of the present invention.

As shown in FIG. 6, the formula for calculating the probability of the News A reaching the News C1 through the News B1 is as below: P(A,B1,C1)=|W1|*|V11|, wherein the || is a weight obtained after performing square standardization on a cosine value of a vector.

W1=cos(A,B1)^2, |W1|+|W2|+|W3|+ . . . =1, V11=cos(B1,C1)^2, |V11|+|V12|+|V13| . . . =1. The information entropy may be obtained through calculation based on the above formula.

Step 430 in the method for calculating relevance among multiple pieces of news in this embodiment further comprises: Step 520: determining a secondary correlation between the first news and the third news according to the information entropy of the first news and of the third news.

An embodiment of the present invention further provides a method for calculating relevance among multiple pieces of news. Compared with the preceding embodiment, when there are multiple pieces of second news, before Step 420, the method for calculating relevance among multiple pieces of news in this embodiment further comprises: searching a corresponding piece of third news for each piece of second news according to a predesigned rule.

Step 130 of the method for calculating relevance among multiple pieces of news in this embodiment specifically comprises:

calculating a weight value of each piece of third news according to a proportion of the second news corresponding to the third news to all the second news, and calculating the secondary correlation between each piece of third news and the first news according to the weight value of the third news and the information entropy corresponding to the third news. In this embodiment, supposing there are N pieces of second news in total and a certain piece of third news is associated with nj pieces of second news therein, the weight value of the third news is IDF=log N/nj, and this weight value can reflect an importance degree of the third news.

An embodiment of the present invention further provides a method for calculating relevance among multiple pieces of news. Compared with the preceding embodiment, when there are multiple pieces of third news, the method for calculating relevance among multiple pieces of news in this embodiment further comprises: sorting the multiple pieces of third news according to a secondary correlation between the multiple pieces of third news and the first news.

In the technical solution of this embodiment, the calculated secondary correlation actually can reflect the semantic similarity among news. Therefore, the more similar third news can be provided to the user by sorting the news according to the secondary correlation.

Figure 7:
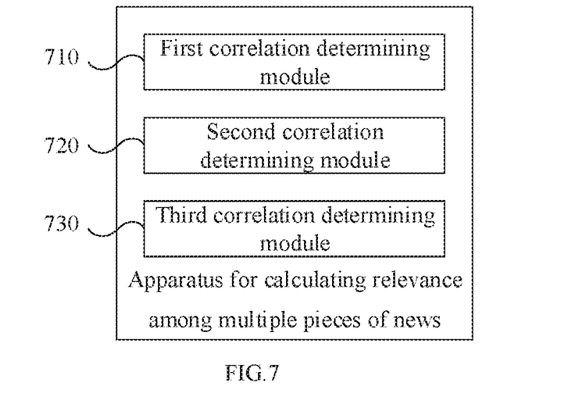
FIG. 7 illustrates a block diagram of an apparatus for calculating relevance among multiple pieces of news according to an embodiment of the present invention.

As shown in FIG. 7, an embodiment of the present invention provides an apparatus for calculating relevance among multiple pieces of news, comprising following modules:

a first correlation determining module 710, configured to determine a primary correlation between a piece of first news and a piece of second news. In this embodiment, the primary correlation between the first news and the second news reflects a similarity between the first news and the second news in literal content;

a second correlation determining module 720, configured to determine a primary correlation between the second news and a piece of third news. The primary correlation between the second news and the third news reflects a similarity between the first news and the second news in literal content;

a third correlation determining module 730, configured to establish a secondary correlation between the first news and the third news according to the primary correlation between the first news and the second news and the primary correlation between the second news and the third news.

According to the technical solution of this embodiment, the secondary correlation between the first news and the third news obtained by calculation is not limited by the literal content. This is because a literally similar portion between the second news and the first news may be different from that between the second news and the third news. The secondary correlation between the first news and the third news actually reflects a semantic similarity between the first news and the third news. Therefore, literally different but semantically similar news may be searched out according to the established secondary correlation of the present invention.

An embodiment of the present invention further provides an apparatus for calculating relevance among multiple pieces of news. Compared with the preceding embodiment, in the apparatus for calculating relevance among multiple pieces of news provided by this embodiment, the first correlation determining module 710 is further configured to set a first vector according to the feature attribute of the first news, set a second vector according to the feature attribute of the second news, calculate a cosine similarity between the first vector and the second vector, and determine the cosine similarity as the primary correlation between the first news and the second news. In this embodiment, no restriction is imposed on the feature attribute. For example, the feature attribute such as word frequency of word segmentation and publication time may be used for generating the vector. Using the cosine similarity as the primary correlation, the obtained primary correlation can reflect the similarity between the first news and the second news. For example, for the News A and the News B, the primary correlation between the News A and the News B is:

$$\text{similarity} = \cos(\theta) = \frac{A \cdot B}{\|A\| \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

wherein the i is a dimension of a vector, and the similarity is a preset similarity.

The second correlation determining module 720 is further configured to set a third vector according to the feature attribute of the third news, calculate a cosine similarity between the second vector and the third vector, and determine the cosine similarity as the primary correlation between the second news and the third news. Likewise, the primary correlation between the second news and the third news may also be calculated out using the cosine similarity.

An embodiment of the present invention further provides an apparatus for calculating relevance among multiple pieces of news. Compared with the preceding embodiment, in the apparatus for calculating relevance among multiple pieces of news provided by this embodiment, the third correlation determining module 730 is further configured to calculate an information entropy of the first news and of the third news according to the primary correlation between the first news and the second news and the primary correlation between the second news and the third news, and determine the secondary correlation between the first news and the third news according to the information entropy of the first news and of the third news.

In this embodiment, a secondary correlation between the first news and the third news is determined using the information entropy, and the obtained secondary correlation can reflect the semantic similarity between the first news and the third news, and is not affected by whether or not being literally similar. For example, when the relation between the News A and the News B is the primary correlation and the relation between the News B and the News C is the primary correlation, the information entropy of the News A and the News C is:

$$H(A, C) = \sum_{B} -p(A, B, C) \log p(A, B, C)$$

wherein the p(A,Bi,C) is a path probability of the News A reaching the News C through the News Bi, and the i indicates that the News B comprises a plurality of news.

As shown in FIG. 6, the formula for calculating the probability of the News A reaching the News C1 through the News B1 is as below: P(A,B1,C1)=|W1|*|V11|, wherein the || is a weight obtained after performing square standardization on a cosine value of a vector.

W1=cos(A,B1)^2, |W1|+|W2|+|W3|+ . . . =1; V11=cos (B1,C1)^2, |V11|+|V12|+|V13| . . . =1. The information entropy may be obtained through calculation based on the above formula.

Figure 8:
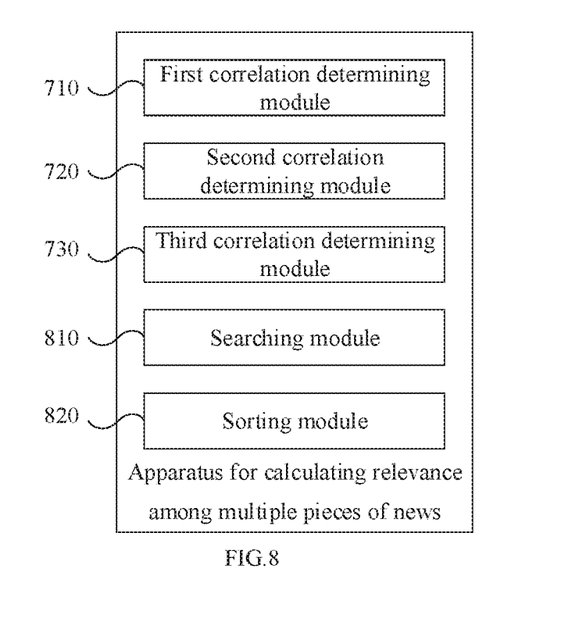
FIG. 8 illustrates a block diagram of an apparatus for calculating relevance among multiple pieces of news according to an embodiment of the present invention.

As shown in FIG. 8, an embodiment of the present invention further provides an apparatus for calculating relevance among multiple pieces of news. Compared with the preceding embodiment, when there are multiple second news, the apparatus for calculating relevance among multiple pieces of news in this embodiment further comprises following modules:

a searching module 810, configured to search a corresponding piece of third news for each piece of second news according to a predesigned rule.

The third correlation determining module 730 is further configured to calculate a weight value of each piece of third news according to a proportion of the second news corresponding to the third news to all the second news, and calculate the secondary correlation between each piece of third news and the first news according to the weight value of the third news and the information entropy corresponding to the third news. In this embodiment, supposing there are N pieces of second news in total and a certain piece of third news is associated with nj pieces of second news therein, the weight value of the third news is IDF=log N/nj, and this weight value can reflect an importance degree of the third news.

As shown in FIG. 8, an embodiment of the present invention further provides an apparatus for calculating relevance among multiple pieces of news. Compared with the preceding embodiment, when there are multiple pieces of third news, the apparatus for calculating relevance among multiple pieces of news in this embodiment further comprises following modules:

a sorting module 820, configured to sort the multiple pieces of third news according to the secondary correlation between the multiple pieces of third news and the first news. In the technical solution of this embodiment, the calculated secondary correlation actually can reflect the semantic similarity among news. Therefore, the more similar third news can be provided to the user by sorting the news according to the secondary correlation.

Many details are discussed in the specification provided herein. However, it should be understood that the embodiments of the present invention can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the present invention, various features of the present invention may sometimes be grouped together into a single embodiment, accompanying figure or description thereof. However, the method of this disclosure should not be constructed as follows: the present invention for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the present invention.

It should be understood by those skilled in the art that modules of the device in the embodiments can be adaptively modified and arranged in one or more devices different from the embodiment. Modules, units or components in the embodiment can be combined into one module, unit or component, and also can be divided into more sub-modules, sub-units or sub-components. Except that at least some of features and/or processes or units are mutually exclusive, various combinations can be used to combine all the features disclosed in the specification (comprising claims, abstract and accompanying figures) and all the processes or units of any methods or devices as disclosed herein. Unless otherwise definitely stated, each of features disclosed in specification (comprising claims, abstract and accompanying figures) may be taken place with an alternative feature having same, equivalent or similar purpose.

In addition, it should be understood by those skilled in the art, although some embodiments as discussed herein comprise some features comprised in other embodiment rather than other feature, combination of features in different embodiments means that the combination is within a scope of the present invention and forms the different embodiments. For example, in the claims, any one of the embodiments for which the protection is sought can be used in any combination manner.

Each of devices according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the apparatus for determining relevance between news and/or the apparatus for calculating relevance among multiple pieces of news according to the embodiments of the present invention. The present invention may further be implemented as equipment or device program (for example, computer program and computer program product) for executing some or all of the methods as described herein. Such program for implementing the present invention may be stored in the computer readable medium, or have a form of one or more signals. Such a signal may be downloaded from the Internet websites, or be provided on a carrier signal, or provided in any other form.

Figure 9:
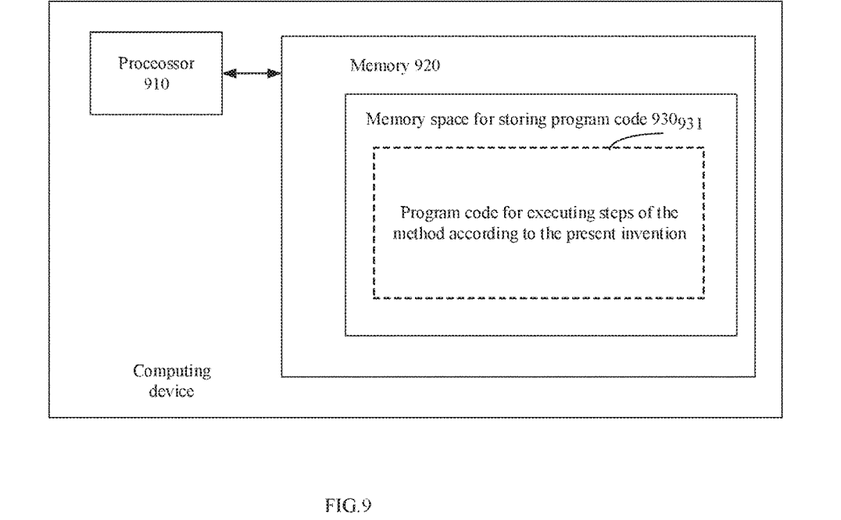
FIG. 9 schematically illustrates a block diagram of a computing device for performing the method for determining relevance between news and/or the method for calculating relevance among multiple pieces of news according to the present invention.
Figure 10:
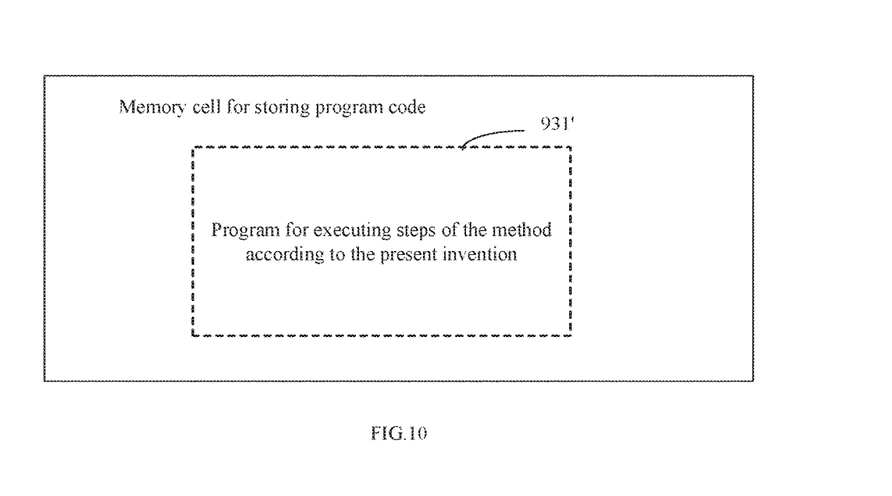
FIG. 10 schematically illustrates a memory cell for maintaining or carrying a program code for implementing the method for determining relevance between news and/or the method for calculating relevance among multiple pieces of news according to the present invention.

For example, FIG. 9 illustrates a computing device that may implement the method for determining relevance between news and/or the method for calculating relevance among multiple pieces of news according to the present invention. Traditionally, the computing device includes a processor 910 and a computer program product or a computer readable medium in form of a memory 920. The memory 920 may be electronic memories such as flash memory, EEPROM (Electrically Erasable Programmable Read-Only Memory), EPROM, hard disk or ROM. The memory 920 has a memory space 930 for executing program codes 931 of any steps in the above methods. For example, the memory space 930 for program codes may comprise respective program codes 931 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 10. The memory cells may be provided with memory sections, memory spaces, etc., similar to the memory 920 of the computing device as shown in FIG. 9. The program codes may be compressed for example in an appropriate form. Usually, the memory cell includes computer readable codes 931' which can be read for example by processors 910. When these codes are operated on the computing device, the computing device may execute respective steps in the method as described above.

"One embodiment", "embodiments" or "one or more embodiments" herein means that particular features, structures or characteristics described in combination with the embodiments are included at least one embodiment of the present invention. Furthermore, it is to be noted that the term "in one embodiment" herein does not necessarily refers to the same embodiment.

It should be noted that the above-described embodiments are intended to illustrate but not to limit the present invention, and alternative embodiments can be devised by a person skilled in the art without departing from the scope of claims as appended. In the claims, no reference mark between round brackets shall impose restriction on the claims. The word "comprise" does not exclude a component or step not listed in the claims. The wording "a" or "an" in front of an element does not exclude the presence of a plurality of such elements. The present invention may be realized by way of hardware comprising a number of different components and by way of a suitably programmed computer. In the unit claim listing a plurality of devices, some of these devices may be embodied in the same hardware. The wordings "first", "second", and "third", etc. do not denote any order. These wordings can be construed as naming.

Also, it should be noticed that the language used in the present specification is chosen for the purpose of readability and teaching, rather than explaining or defining the subject matter of the present invention. Therefore, it is apparent to an ordinary skilled person in the art that modifications and variations could be made without departing from the scope and spirit of the claims as appended. For the scope of the present invention, the publication of the present invention is illustrative rather than restrictive, and the scope of the present invention is defined by the appended claims.

What is claimed is:

1. A method for determining relevance between news, comprising:
    comparing first news with benchmarking, news to obtain a distance between the first news and the benchmarking news;
    comparing second news with the benchmarking news to obtain a distance between the second news and the benchmarking news;
    calculating a distance differential between the distance between the first news and the benchmarking news and the distance between the second news and the benchmarking news and determining the relevance between the first news and the second news according to the distance differential;
    wherein the comparing first news with benchmarking news to obtain a distance between the first news and the benchmarking news further comprises:
    acquiring a feature attribute of the first news,
    generating a vector corresponding to the first news according to the feature attribute of the first news, and
    comparing the vector corresponding to the first news with a vector corresponding to the benchmarking news; and
    wherein the comparing second news with the benchmarking news to obtain a distance between the second news and the benchmarking news further comprises:
    acquiring a feature attribute of the second news,
    generating a vector corresponding to the second news according to the feature attribute of the second news, and
    comparing the vector corresponding to the second news with the vector corresponding to the benchmarking news.

2. The method according to claim 1, wherein before comparing the first news with the benchmarking news, the method further comprises:
    recognizing a type of the first news and selecting the benchmarking news having a corresponding type from a set of benchmarking news.

3. The method according to claim 1, wherein before comparing the first news with the benchmarking news, the method further comprises:
    acquiring a keyword in the first news and selecting the benchmarking news having the keyword from the set of benchmarking news.

4. The method according to claim 1, wherein
    the acquiring a feature attribute of the first news further comprises:
    performing word segmentation on the first news to obtain a plurality of words, calculating a word frequency of the plurality of words of the first news, and determining the word frequency as the feature attribute of the first news; and
    the acquiring a feature attribute of the second news further comprises:
    performing word segmentation on the second news to obtain a plurality of words, calculating a word frequency of the plurality of words of the second news, and determining the word frequency as the feature attribute of the second news.

5. The method according to claim 1, wherein determining the relevance between the first news and the second news according to the distance differential further comprises:
    setting the second news as a piece of news related to the first news when the distance differential is within a preset interval; and
    pushing the second news when it is required to push news related to the first news.

6. An apparatus for determining relevance between news, comprising:
    a processor; and
    a memory communicatively coupled to the processor and storing instructions that upon execution by the processor cause the apparatus to:
    compare first news with benchmarking news to obtain a distance between the first news and the benchmarking news,
    compare second news with the benchmarking news to obtain a distance between the second news and the benchmarking news,
    calculate a distance differential between the distance between the first news and the benchmarking news and the distance between the second news and the benchmarking news to determine the relevance between the first news and the second news according to the distance differential, wherein the memory further storing instructions that upon execution by the processor cause the apparatus to:

acquire a feature attribute of the first news, generate a vector corresponding to the first news according to the feature attribute of the first news, compare the vector corresponding to the first news with a vector corresponding to the benchmarking news, acquire a feature attribute of the second news, generate a vector corresponding to the second news according to the feature attribute of the second news, and compare the vector corresponding to the second news with the vector corresponding to the benchmarking news.

7. The apparatus according to claim 6, wherein the memory further storing instructions that upon execution by the processor cause the apparatus to:

recognize a type of the first news and select the benchmarking news having a corresponding type from a set of benchmarking news.

8. The apparatus according to claim 6, wherein the memory further storing instructions that upon execution by the processor cause the apparatus to:

acquire a keyword in the first news and select the benchmarking news having the keyword from the set of benchmarking news.

9. The apparatus according to claim 6, wherein the memory further storing instructions that upon execution by the processor cause the apparatus to:

perform word segmentation on the first news to obtain a plurality of words, calculates a word frequency of the plurality of words of the first news, and determines the word frequency as the feature attribute of the first news; and perform word segmentation on the second news to obtain a plurality of words, calculates a word frequency of the plurality of words of the second news, and determines the word frequency as the feature attribute of the second news.

10. The apparatus according to claim 6, wherein the memory further storing instructions that upon execution bathe processor cause the apparatus to:

identify the second news as a piece of news related to the first news when the distance differential is within a preset interval; and push the second news when it is required to push news related to the first news.

* * * * *